US008656658B2

(12) United States Patent
Shufflebotham et al.

(10) Patent No.: US 8,656,658 B2
(45) Date of Patent: Feb. 25, 2014

(54) RETAINERS FOR ATTACHING PHOTOVOLTAIC MODULES TO MOUNTING STRUCTURES

(75) Inventors: Paul Shufflebotham, San Jose, CA (US); Todd Krajewski, Mountain View, CA (US)

(73) Assignee: Miasole, Santa Clara, CA (US)

( * ) Notice: Subject to any disclaimer, the term of this patent is extended or adjusted under 35 U.S.C. 154(b) by 605 days.

(21) Appl. No.: 12/908,778

(22) Filed: Oct. 20, 2010

(65) Prior Publication Data

US 2012/0097207 A1   Apr. 26, 2012

(51) Int. Cl.
*E04D 3/18* (2006.01)
(52) U.S. Cl.
USPC ......................................................... 52/173.3
(58) Field of Classification Search
USPC ................... 52/173.3; 136/251; 126/621, 623
See application file for complete search history.

(56) References Cited

U.S. PATENT DOCUMENTS

| | | | |
|---|---|---|---|
| 4,832,001 A | | 5/1989 | Baer |
| 4,942,865 A | * | 7/1990 | Pierce-Bjorklund ......... 126/633 |
| 5,043,024 A | | 8/1991 | Cammerer et al. |
| 5,460,660 A | | 10/1995 | Albright et al. |
| 5,505,788 A | * | 4/1996 | Dinwoodie .................... 136/246 |
| 5,746,839 A | | 5/1998 | Dinwoodie |
| 6,082,060 A | * | 7/2000 | Bauer et al. ................... 52/173.3 |
| 6,201,179 B1 | * | 3/2001 | Dalacu .......................... 136/244 |
| 6,672,018 B2 | | 1/2004 | Shingleton |
| 6,959,517 B2 | * | 11/2005 | Poddany et al. ............. 52/173.3 |
| 8,209,919 B2 | * | 7/2012 | Beck ............................ 52/173.3 |

(Continued)

FOREIGN PATENT DOCUMENTS

| | | | | |
|---|---|---|---|---|
| GB | 2049158 A | * | 12/1980 | ................. F24J 3/02 |
| JP | 06085302 A | * | 3/1994 | ............ H01L 31/042 |

OTHER PUBLICATIONS

Unirac Bright Thinking in Solar, latest press releases, "Unirac's solarmount-I chosen by arise solar for 200kW installation to power residential apartment complex", Unirac revolutionizes residential PV mounting with introduction of solarmount-I", Unirac launches non-penetrating attachment for seamed metal roofs", "Spire corporation chooses Unirac and CLICKSYS to support 1.6MW solar project", "Rosendin electric, Inc. selects Unirac to support 1.15MW San Jose international airport solar project", May 4, 2010—Aug. 30, 2010, downloaded from http://www.unirac.com on Sep. 30, 2010,.

(Continued)

*Primary Examiner* — Christine T Cajilig
(74) *Attorney, Agent, or Firm* — Weaver Austin Villeneuve & Sampson LLP

(57) ABSTRACT

Provided are photovoltaic module assemblies configured for improved installation. The assemblies include frameless photovoltaic modules and retainers for supporting the modules on mounting structures. The retainers support the modules at least during cure of adhesive materials provided between the modules and the mounting structures. Once cured, the adhesive materials provide permanent support to the modules. The retainers may interlock with the mounting structures during installation or be integral components of the structures. In certain embodiments, retainers are used to control a gap between the modules and mounting structures. Retainers may be removable and collected after installation is completed. Alternatively, retainers may remain as parts of assemblies at least during some initial period. Retainers may be made from various degradable materials, such as biodegradable plastics, UV degradable plastics, and/or water soluble materials. Provided also are methods for installing frameless photovoltaic modules on mounting structures.

30 Claims, 5 Drawing Sheets

(56) References Cited

U.S. PATENT DOCUMENTS

| | | | |
|---|---|---|---|
| 2002/0029799 A1 | 3/2002 | Yoda et al. | |
| 2003/0070368 A1 | 4/2003 | Shingleton | |
| 2005/0178428 A1 | 8/2005 | Laaly et al. | |
| 2006/0243318 A1 | 11/2006 | Feldmeier et al. | |
| 2008/0066801 A1 | 3/2008 | Schwarze | |
| 2008/0236571 A1* | 10/2008 | Keshner et al. | 126/623 |
| 2008/0302409 A1 | 12/2008 | Bressler et al. | |
| 2008/0308142 A1* | 12/2008 | Grip et al. | 136/251 |
| 2008/0315061 A1 | 12/2008 | Fath et al. | |
| 2009/0114270 A1 | 5/2009 | Stancel | |
| 2009/0114271 A1 | 5/2009 | Stancel | |
| 2009/0250580 A1 | 10/2009 | Strizki | |
| 2010/0038507 A1 | 2/2010 | Schwarze et al. | |
| 2010/0059641 A1 | 3/2010 | Twesme et al. | |
| 2010/0132766 A1* | 6/2010 | Jenkins | 136/251 |
| 2010/0269428 A1* | 10/2010 | Stancel et al. | 52/173.3 |
| 2011/0197954 A1* | 8/2011 | Young et al. | 136/251 |
| 2011/0265861 A1* | 11/2011 | Nabauer et al. | 136/251 |
| 2012/0080074 A1 | 4/2012 | Hardikar et al. | |
| 2012/0080075 A1 | 4/2012 | Hardikar et al. | |
| 2012/0080076 A1 | 4/2012 | Hardikar et al. | |
| 2012/0080077 A1 | 4/2012 | Balyon et al. | |
| 2012/0097207 A1 | 4/2012 | Shufflebotham et al. | |
| 2012/0234378 A1* | 9/2012 | West et al. | 136/251 |
| 2012/0260977 A1* | 10/2012 | Stancel | 136/251 |

OTHER PUBLICATIONS

Schletter Inc., "Module clamps overview" catalogue, www.schletter-inc.us, update 2009.

International Search Report and Written Opinion mailed Apr. 24, 2012, for Application No. PCT US2011/053972.

International Search Report and Written Opinion mailed May 17, 2012, for Application No. PCT US2011/056637.

U.S. Appl. No. 12/894,704, Office Action mailed Jan. 16, 2013.

U.S. Appl. No. 12/895,328, Office Action mailed Jun. 7, 2013.

U.S. Appl. No. 12/895,594, Office Action mailed May 31, 2013.

* cited by examiner

RETAINERS FOR ATTACHING PHOTOVOLTAIC MODULES TO MOUNTING STRUCTURES

BACKGROUND

Photovoltaic cells are widely used for electricity generation, with multiple photovoltaic cells interconnected in photovoltaic modules. These photovoltaic modules (also referred to as solar modules or solar panels) can be installed on rooftops and pole tops. Installing photovoltaic modules on a rooftop or other surface generally involves determining module positioning on the surface, installing a structural support in accordance with the desired positioning, attaching the modules to the structural support, and wiring the modules.

SUMMARY

Provided are photovoltaic module assemblies configured for improved installation. The assemblies include frameless photovoltaic modules and retainers for supporting the modules on mounting structures. The retainers support the modules at least during cure of adhesive materials provided between the modules and the mounting structures. Once cured, the adhesive materials provide permanent support to the modules. The retainers may interlock with the mounting structures during installation or be integral components of the structures. In certain embodiments, retainers are used to control a gap between the modules and mounting structures. Retainers may be removable and collected after installation is completed. Alternatively, retainers may remain as parts of assemblies at least during some initial period. Retainers may be made from various degradable materials, such as biodegradable plastics, UV degradable plastics, and/or water soluble materials. Provided also are methods for installing frameless photovoltaic modules on mounting structures.

In certain embodiments, a photovoltaic assembly includes a frameless photovoltaic module having a frontside sheet and a backside sheet, a mounting structure having two rails in contact with the backside sheet, an adhesive material distributed between the backside sheet and each of the two rails, and one or more retainers attached to the mounting structure. The one or more retainers are configured to support the frameless photovoltaic module on the mounting structure during curing of the adhesive material. The adhesive material is configured for attaching the backside sheet and the two rails after the adhesive material is cured. Once the adhesive material is cured, the photovoltaic module may be supported by the adhesive material or a combination of the adhesive materials and one or more retainers.

In certain embodiments, a retainer is configured to interlock with one or both rails of the mounting structure. The retainer may exert a force onto a frontside sheet of the frameless photovoltaic module. The retainer may be made of one or more of the following biodegradable polymers: a starch-based polymer, a cellulose-based polymer, an amylase-based polymer, a polylactic acid, a polyhydroxybutyrate, a polybutylenesuccinate, a polycaprolactone, and a polyglycolide. In the same or other embodiments, the retainer is made of one or more UV-degradable plastics. In some embodiments, the retainer is made of one or more water soluble plastics. In certain embodiments, a retainer has a flexible edge configured to flex during the installation of the retainer. For example, the flexible edge may be pushed in a compressed/"flexed" state through a narrow opening and then open up inside a wider cavity of the mounting structure (e.g., a channel formed by a mounting rail) to form an interlocking mechanism.

In certain embodiments, a retainer forms a channel configured to snugly fit around an edge of the frameless photovoltaic module and/or a portion of the mounting structure. A retainer may be in contact with an adhesive material. For example, an adhesive material may be distributed around/or on the retainer during the installation. Alternatively, one or more patches of the adhesive material and one or more retainers may be in different locations. These latter embodiments may be used when retainers need to be later removed or degraded.

In certain embodiments, a frameless photovoltaic module has a glass sheet as a frontside sealing sheet. The glass sheet may be protected from contacting any metallic components of the mounting structure. In other embodiments, a frontside sheet and/or a backside sheet are flexible. A backside sheet may be made from one of the following materials: a polyethylene terephthalate, a polypropylene, a polybutylene, and a polybutylene terephthalate. In certain embodiments, a frameless photovoltaic module comprises a feature configured for engaging/interlocking with a portion of the retainer.

An adhesive material may be a silicone-based polymer, polyurethane, and/or epoxy. In certain embodiments, an adhesive material is a fast setting two-component adhesive. In the same or other embodiments, an adhesive material is a UV-stable adhesive. A backside sheet may be pre-treated to improve its bonding to the adhesive material.

In certain embodiments, a photovoltaic assembly also includes a second frameless photovoltaic module positioned on the same mounting structure as the first module. The second module also has an adhesive material distributed between this module and the mounting structure. In particular embodiments, one or more retainers are positioned between the two modules and at least partially support both modules on the mounting structure during curing of the adhesive material. According to various embodiments, the assemblies described herein may be provided in unassembled component parts, fully assembled, or in various stages of assembly.

In certain embodiments, a frameless photovoltaic module is positioned at a mounting angle greater than about 15° relative to horizontal. Generally, steeper mounting angles require more initial support from retainers, while the adhesive is curing. In other embodiments, the module is positioned at mounting angle less than about 15° relative to horizontal, e.g., on a flat surface. A frameless photovoltaic module may be supported on structures made from various materials. In certain embodiments, two rails of the mounting structure are made from aluminum and/or steel. In the same or other embodiments, one or both rails of the mounting structures are formed as a U-shaped or C-shape channel. In certain embodiments, a frameless photovoltaic module includes multiple interconnected copper indium gallium selenide (CIGS) cells. In certain embodiments, a retainer includes a spacer extending between the backside sheet and the mounting structure and controlling a thickness of the adhesive materials distributed between the backside sheet and each of the two rails.

Provided also methods for installing a frameless photovoltaic module on a mounting structure. In certain embodiments, a method involves providing a mounting structure, applying an adhesive material onto rails of the structure, positioning the frameless photovoltaic module onto the structure, and installing one or more retainers mechanically attaching the module to the structure. The installed retainers support the frameless photovoltaic module on the mounting structure during, at least, curing of the adhesive material. The method may also involve curing the adhesive material such that the adhesive material is fully cured in less than about 8 hours. In certain embodiments, the method also involves removing the one or more retainers after the adhesive material is cured. In the same or other embodiments, one or more retainers are installed on a mounting structure prior to positing the frameless photovoltaic module onto the mounting structure.

These and other aspects of the invention are described further below with reference to the figures.

DETAILED DESCRIPTION OF EXAMPLE EMBODIMENTS

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.
Introduction Photovoltaic modules can be supported using various types of mounting structures, which are positioned on buildings (e.g., on rooftops) or can be standalone structures (e.g., photovoltaic pole tops). Mounting structures include rails, top/bottom/end clamps, top/bottom clips, junction plates, T-bolts, flange nuts, and various other hardware components. These components are made of metal and can be expensive. Heavy fragile modules often have metal frames for additional support. Frameless photovoltaic modules, which do not include a frame positioned along the edges of the module, are lighter. Frameless photovoltaic modules may be fabricated with thin glass sheets and/or plastic materials, such as polytetrafluoroethylene (PTFE).

Figure 1A:
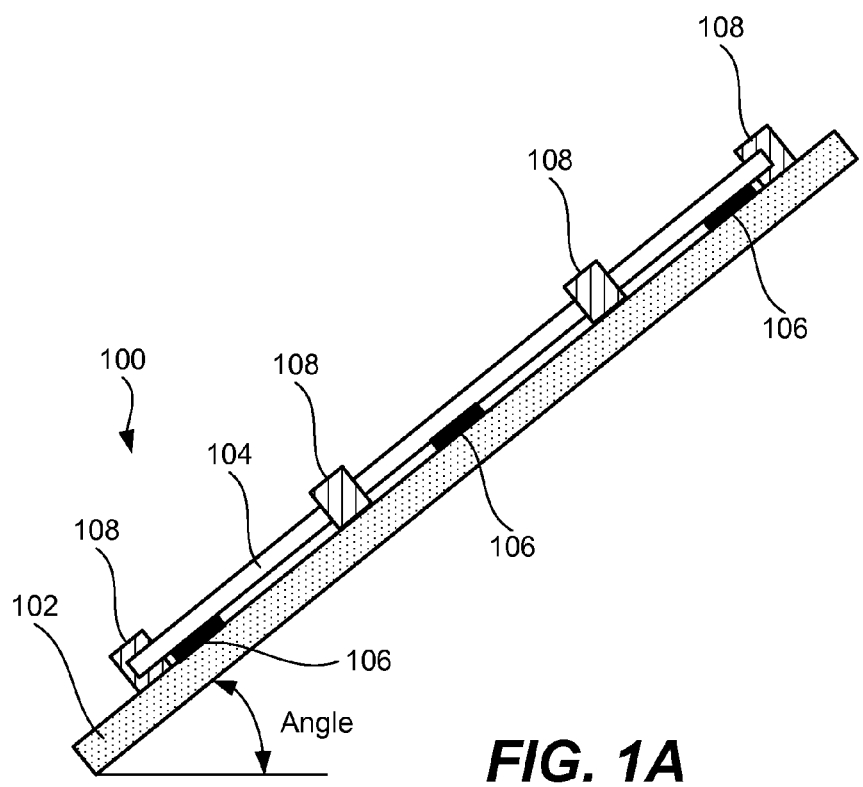
FIG. 1A is a side schematic view of a photovoltaic assembly including a photovoltaic module supported on a mounting structure using retainers and/or adhesive patches in accordance with certain embodiments.

Assemblies and methods for improved installation of frameless photovoltaic modules are described herein. In certain embodiments, a frameless photovoltaic module is glued to a mounting structure without a need for additional mounting hardware, at least after the adhesive is cured. While the adhesive is curing, the support may be provided by one or more specially configured retainers. The novel retainers described herein are inexpensive and configured for use with adhesive materials and frameless module components. These retainers provide sufficient initial support, while the adhesive is curing, and often can not be used on their own for the entire operating life of the module. In certain embodiments, retainers are fabricated from biodegradable and/or UV degradable materials such that they disappear after some initial period and do not interfere with esthetics and/or functions of the module.
Photovoltaic Assembly Examples FIG. 1A is a schematic side view of a photovoltaic assembly 100 including a frameless photovoltaic module 104 positioned on a mounting structure 102 in accordance with certain embodiments. Mounting structure 102 may include one or more rails that may be supported by a rooftop, pole top, or some other supporting structure. Typically, each module is positioned on at least two rails that form a substantially flat mounting surface. Additional rails (e.g., three or more) may be used for particularly large and/or fragile photovoltaic modules and/or for modules operating in severe environmental conditions (e.g., strong winds and/or steep mounting angles). Some examples of rails include UniRac® slot rails (Part Numbers 963UNISM and 963UNISF) available from SunWize Technologies in San Jose, Calif. Other types of rails and mounting structures can be used as well.

In certain embodiments, mounting structure 102 forms a mounting angle with horizontal (shown as "Angle" in FIG. 1A). This mounting angle may be at least about 15° or, more particularly, at least about 30° C., and even at least about 45°. A steeper mounting angle generally requires more support for the photovoltaic modules during installation and operation. Thus, a mounting angle may be one of the factors in selecting a type and a number of retainers used during installation of a module.

Figure 1B:
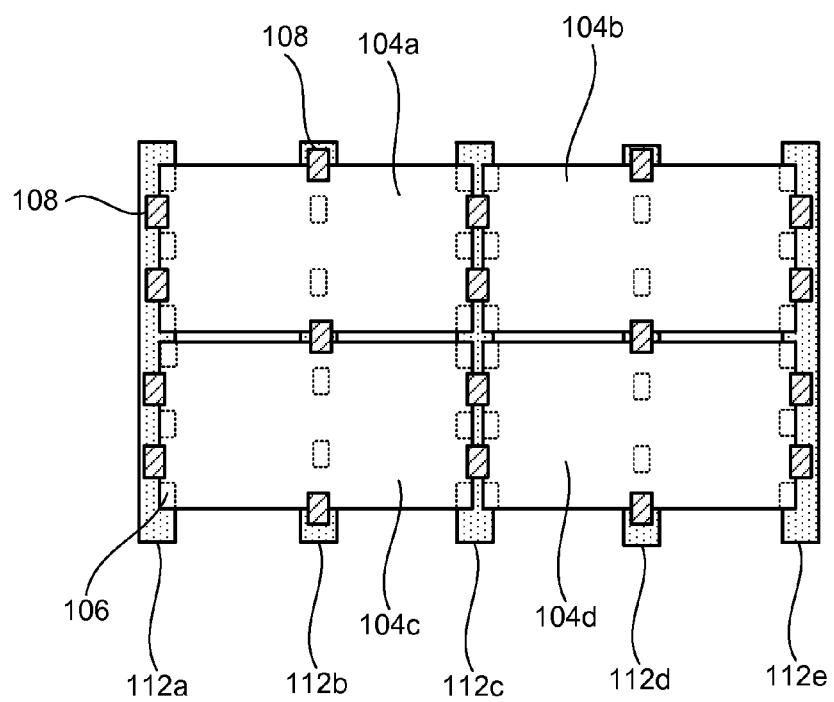
FIG. 1B is a top schematic view of multiple frameless photovoltaic modules sharing several mounting structures and retainers in accordance with certain embodiments.

Three adhesive material patches 106 are shown in a cross-sectional view of photovoltaic assembly 100 in FIG. 1A. These patches are disposed between frameless module 104 and mounting structure 102 and used for permanent support of module 104. In general, any number of adhesive material patches could be used to provide support. For example, FIG. 1B illustrates each module 104a-104d being supported by eight adhesive material patches 106. In certain embodiments, an adhesive material may form one or more continuous strips at each discreet interface between mounting structure 102 and module 104, e.g., each rail may have one corresponding strip of an adhesive material at the interface with a module.

In certain embodiments, a cured adhesive material (e.g., all adhesive patches combined) is capable of fully supporting photovoltaic module 104 on mounting structure 102 during operation of module 104. In these embodiments, retainers may be removed after installation is complete or may be made from a degradable material. In other embodiments, retainers are kept as a part of the assembly and may be relied upon for some additional support after the adhesive material is fully cured. For purposes of this document, a "fully cured" adhesive material is defined as an adhesive material that has reached its specified mechanical properties after being dispensed on respective bonded surfaces. In certain embodiments, the adhesive is a one or two component adhesive. In certain embodiments, an adhesive material is a fast curing/setting two-component adhesive. A fast curing adhesive shortens the period during which a module is supported by one or more retainers. In certain embodiments, an adhesive is fully cured in less than about 24 hours or, more particularly, in less than about 12 hours, or even less than about 1 hour. In certain embodiments, an adhesive is a slow setting adhesive, i.e., an adhesive that is fully cured within about 24 to 48 hours.

Some examples of adhesive materials include silicone-based polymer, polyurethane, and epoxy, such as silicone adhesives (part numbers 3-1595 and 3-1595HP), thixotropic adhesive (part number 3-6265), silane and siloxane based adhesives (part number 4-8012), primer-less silicone adhesive (part number 866), heat cured one part adhesive (part number SE1771), thixotropic fast low temperature cure adhesive (part number EA-6054), two part translucent heat cure adhesive (part number SE1700), Sylgard® 577 primer-less silicone adhesive, and two-part controlled-volatility (CV) grade adhesive (part number SE1720)—all available from Dow Corning in Midland, Mich. In the same or other embodiments, an adhesive material is a UV-stable adhesive. Another example is a Room Temperature Vulcanizing (RTV) adhesive, such as PV-104, Dow Corning® SE 738, Dow Corning® 838 Silicone Adhesive, Dow Corning® 839 Silicone Adhesive, Dow Corning® SE 9120, Dow Corning® SE 9157, available from Dow Corning, in Midland, Mich. In particular embodiments, at least a portion of the backside sheet surface of the module (e.g., a portion that contacts an adhesive material) is pre-treated to improve its adhesion to an adhesive material.

The cross-sectional view of photovoltaic assembly 100 in FIG. 1A illustrates four retainers 108 attached to mounting structure 102 that support frameless photovoltaic module 104. In general, any number of retainers may used to provide initial support to photovoltaic module 104. For example, in FIG. 1B, each of four modules 104a-104d is supported by six retainers 108. More specifically, two retainers are shown along each short side of rectangular modules 104a-104d, and one along each long side. Retainers 108 can also be positioned around corners of the modules (not shown). Some retainers may be shared by two or more modules. For example, FIG. 1B illustrates two retainers being shared by modules 104a and 104b, and one retainer being shared by modules 104a and 104c.

A mounting structure shown in FIG. 1B includes five rails 112a-112e. Each one of frameless photovoltaic modules 104a-104d is supported by three of these rails. Module 104a is supported by rails 112a, 112b, and 112c; module 104b is supported by rails 112c, 112d, and 112e; module 104c is supported by rails 112a, 112b, and 112c; and module 104d is supported by rails 112c, 112d, and 112e. In certain embodiments, all or some rails are shared by two or more modules, e.g., in FIG. 1B, rail 112a supports modules 104a and 104c, and rail 112c supports all four modules 104a-104d. In alternate embodiments, one or rails may each support only a single module.

Figure 1C:
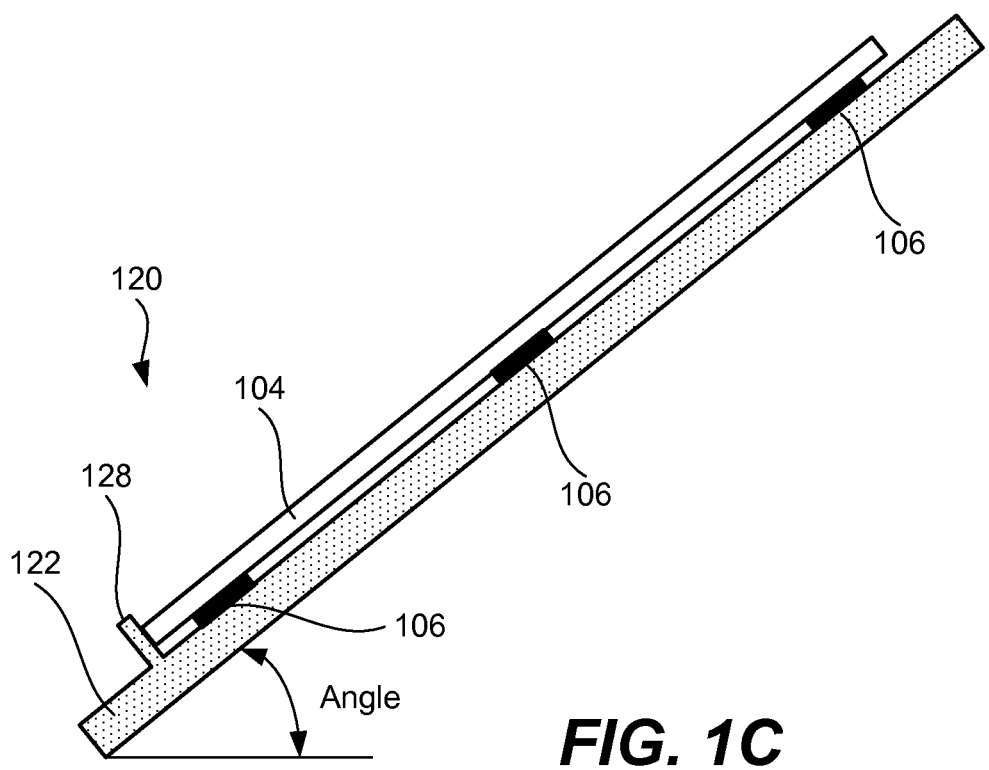
FIG. 1C is a side schematic view of a photovoltaic assembly including a photovoltaic module supported on a mounting structure by adhesive patches and a retainer that is an integral part of the structure in accordance with certain embodiments.

Retainers shown in FIGS. 1A and 1B and further described in the context of FIGS. 2A-2D may be separate components that are attached to mounting structures prior or during installation of frameless photovoltaic modules. In other embodiments, one or more retainers may be integral parts of a mounting structure. FIG. 1C is a side schematic view of a photovoltaic assembly including a mounting structure 122 and a photovoltaic module 104 supported on mounting structure 122 by a retainer 128, which is an integral part of mounting structure 122, in accordance with certain embodiments. Some examples include build-in fixed retainers, such as ledges extending from rails.

Retainer Examples

Figure 2A:
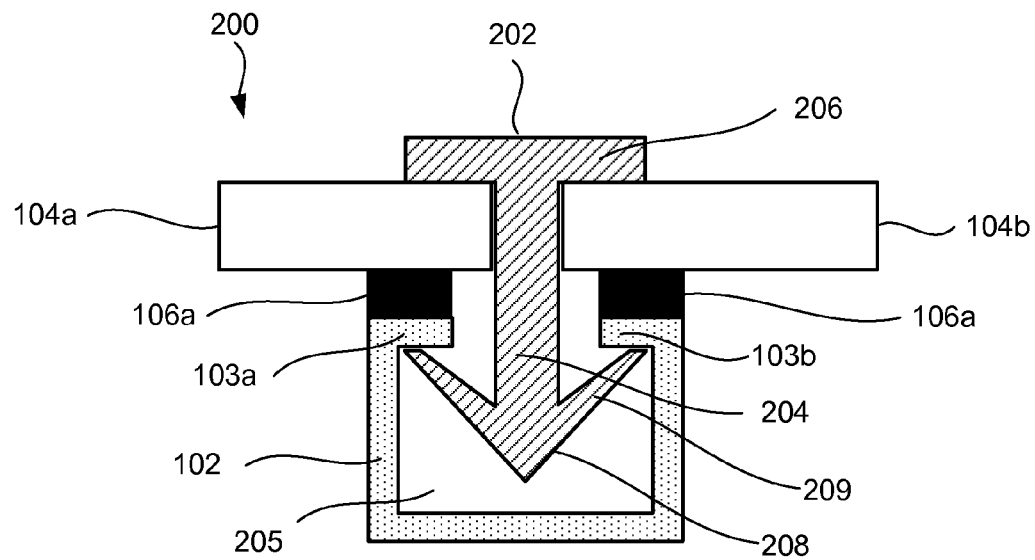
FIG. 2A is a cross-sectional view of a photovoltaic assembly including a mounting structure, two photovoltaic modules attached to the mounting structure using individual adhesive patches and a shared retainer in accordance with certain embodiments.

FIG. 2A is a cross-sectional view of a photovoltaic assembly 200 including mounting structure 102, two frameless photovoltaic modules 104a and 104b, and a retainer 202 in accordance with certain embodiments. Modules 104a and 104b are attached to mounting structure 102 using two adhesive patches 106a and 106b and shared retainer 202. Retainer 202 has a stem 204 connecting a head 206 and an interlocking tip 208. In certain embodiments, interlocking tip 208 includes one or more flexible features (e.g., extensions) that are capable of flexing towards stem 204 when interlocking tip 208 is pushed through a narrow opening. In the example shown in FIG. 2A, angled extensions 209 are flexible features of interlocking tip 208. Such flexible features on interlocking tip 208 are also configured to flex away from stem 204 when reaching a wider opening, such as a hollow portion inside mounting structure 102. As shown in FIG. 2A, mounting structure 102 may include a partially enclosed channel 205 with two extensions 103a and 103b extending from sidewalls of channel 205 to form a narrow opening into the hollow portion of channel 205. During installation, modules 104a and 104b are aligned such that the gap between them is approximately aligned with the narrow opening. Interlocking tip 208 is then pushed through the gap formed by two modules 104a and 104b and the narrow opening of mounting structure 102. While being through, flexible features 209 are flexed toward stem 204 and may lie flush against stem 204 (not shown).

Once interlocking tip 208 reaches the hollow portion of channel 205, its flexible features 209 flex away from stem 204 as shown in FIG. 2A and interlock with two extensions 103a and 103b of mounting structure 102. In this position, retainer 202 can not be pulled out of mounting structure 102 without first compressing flexible features 209 of interlocking tip 208 inside the hollow portion of mounting structure 102. In certain embodiments (not shown), a retainer may be installed from a mounting structure side, such that the interlocking tip first passes a narrow opening formed by the mounting structure and then a similar opening formed by the frameless photovoltaic modules. The interlocking tip then interlocks with the frontside of the module.

The length of stem 204 may be configured such that head 206 comes in contact with front sides of frameless photovoltaic modules 104a and 104b in the final installed position (e.g., when interlocking tip 208 is pressed against two extensions 103a and 103b of mounting structure 102). The length of stem 204 depends on thicknesses of photovoltaic modules 104a and 104b, extensions 103a and 103b, and adhesive patches 106a and 106b. In certain embodiments, retainer 202 may exert some downward (i.e., towards mounting structure 102) pressure on front sides of photovoltaic modules 104a and 104b in the installed position.

Figure 2B:
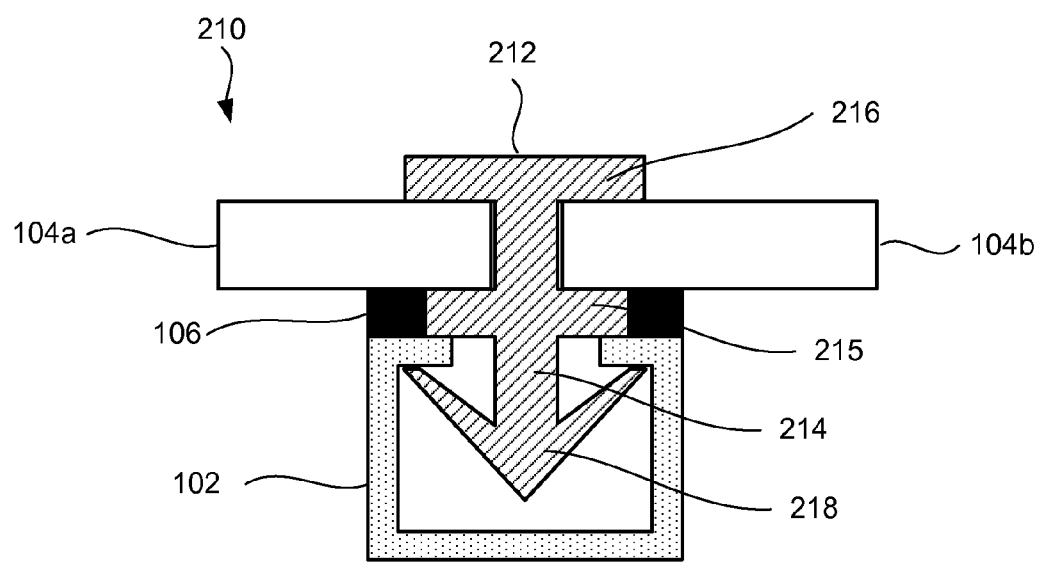
FIG. 2B is a cross-sectional view of a photovoltaic assembly including two photovoltaic modules attached to a mounting structure using individual adhesive patches and a shared retainer that controls a gap between the modules and mounting structure in accordance with certain embodiments.

In certain embodiments, a retainer is specifically configured to control a gap between photovoltaic modules 104a and 104b and mounting structure 102. This control may be needed to ensure that adhesive patches have a certain predetermined thickness, to avoid direct contact between the modules and mounting structure elements (e.g., to prevent breakage of glass sealing sheets), and/or other reasons. In certain embodiments, this gap is set to between about 2 mils and 50 mils or, more particularly, between about 5 mils and 25 mils. FIG. 2B is a cross-sectional view of a photovoltaic assembly 210 including mounting structure 102, two photovoltaic modules 104a and 104b and a retainer 212 in accordance with certain embodiments. Retainer 212 has a stem 214 with one or more spacers 215 extending sideward from stem 214 into the gap between modules 104a and 104b and mounting structure 102. Modules 104a and 104b and mounting structure 102 may be pressed against spacers 215 by, for example, a head 216 and/or an interlocking tip 218 of retainer 212. Head 216 may form one or more slot together with spacers 215 for receiving frameless photovoltaic modules 104a and 104b (e.g., snugly fitting around edges of the modules). In certain embodiments, retainer 212 may form two (as shown in FIG. 2B) or more slots for receiving multiple modules. For example, a corner retainer may have four corner slots for receiving four corners of the photovoltaic modules.

Spacers 215 (as well as spacers 235 shown in FIG. 2D and further discussed below) may be used to control a thickness of adhesive patches (e.g., elements 106). This in turn may help to mitigate differences in Coefficients of Thermal Expansion (CTEs) of mounting structure 102 and photovoltaic modules 104a and 104b. A photovoltaic array may go through substantial temperature fluctuations sometimes exceeding 50° C. and even 100° C. throughout the date. This may put significant stresses on adhesive patches 106. For example, typical mounting structure materials like aluminum and stainless steel have linear CTEs of about $23 \times 10^{-6}/°$ C. and $17.3 \times 10^{-6}/°$ C. respectively, while typical sealing sheet materials like glass and PVC have linear CTEs of about $3-8 \times 10^{-6}/°$ C. and $52 \times 10^{-6}/°$ C. respectively. Based on that, a 1 meter long backside PVC sheet of a photovoltaic module may expand 3 millimeter longer than an aluminum rail supporting it. A selection of flexible adhesive materials and a precise control of adhesive patches' thickness may be important to preserve this adhesive bond overtime.

Figure 2C:
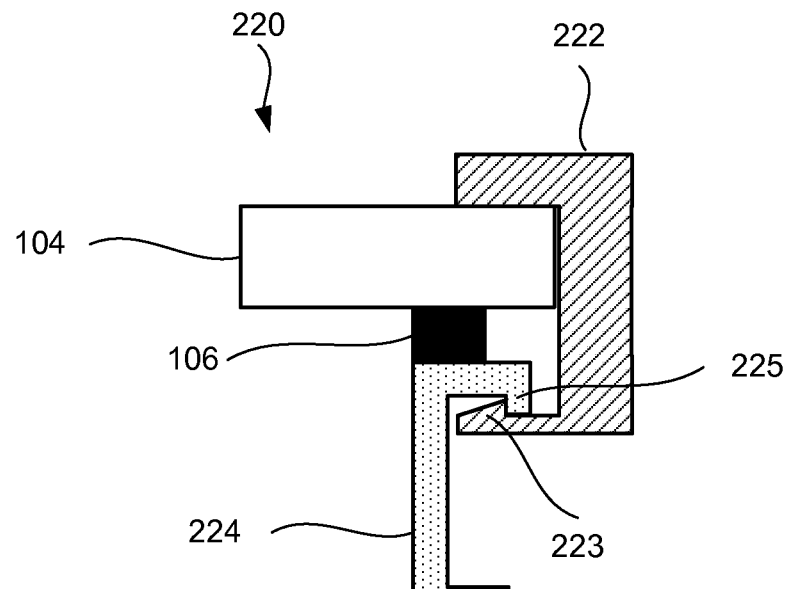
FIG. 2C is a cross-sectional view of a photovoltaic assembly including a module attached to a mounting structure with an adhesive patch and a retainer in accordance with certain embodiments.

According to various embodiments, a retainer may be positioned in a variety of ways with respect to a mounting structure and/or photovoltaic module. In one embodiment, a retainer forms a C-shape channel around the module's edge and portion of the mounting structure. FIG. 2C is a cross-sectional view of a photovoltaic assembly 220 including a mounting structure 224 and module 104 attached to mounting structure 224 with adhesive patch 106 and a retainer 222 in accordance with certain embodiments. Retainer 222 can be installed after photovoltaic module 104 is located on mounting structure 224. The final alignment (setting a gap between photovoltaic module 104 and mounting structure 224, aligning edges of photovoltaic module 104 and mounting structure 224) may be further achieved during installation of retainer 222. Retainer 222 may be snugly fit around both edges of photovoltaic module 104 and mounting structure 224 and, in certain embodiments, align these two components with respect to each other.

Figure 2D:
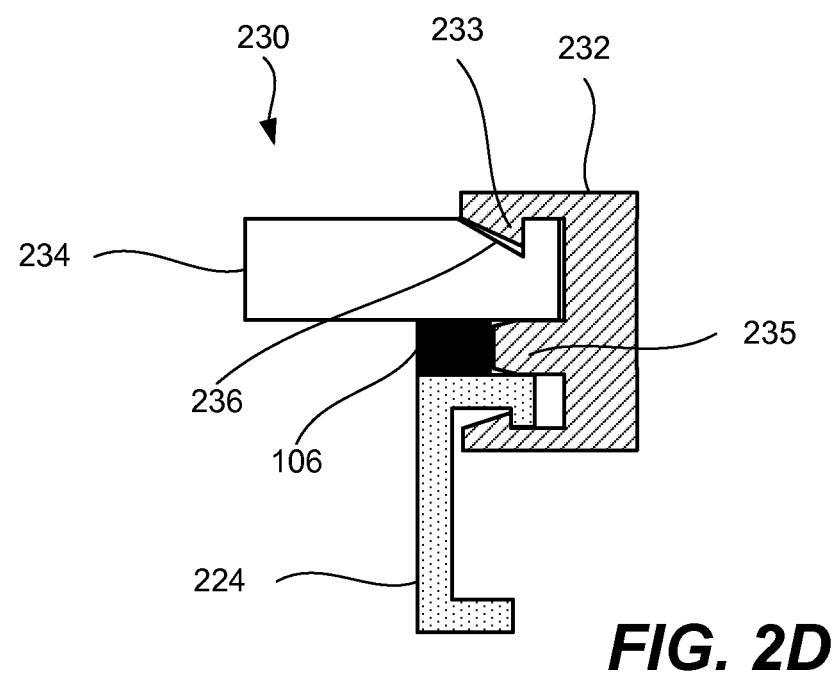
FIG. 2D is a cross-sectional view of a photovoltaic assembly including a module attached to a mounting structure with an adhesive patch and a retainer that also controls a gap between the module and mounting structure in accordance with certain embodiments.

In certain embodiments, a retainer has one or more interlocking features that interlock with a mounting structure and/or a photovoltaic module. As shown in FIG. 2C, retainer 222 has a latch 223 that slides over a corresponding latch 225 of mounting structure 224. One or both latches may be flexible to allow sliding with respect to each other during installation. In the same or other embodiments, other elements of photovoltaic assembly 220 are flexible to allow these latches to engage. Once the two latches engage, they can not slide back effectively forming an interlocking mechanism. FIG. 2D illustrates another photovoltaic assembly 230 where a retainer 232 also interlocks with a frameless photovoltaic module 234. As shown, module 234 may have a receiving slot 236 for accommodating a module-side latch 233 of retainer 232. Furthermore, retainer 232 is shown to have a spacer 235 that extends into a gap between photovoltaic module 234 and mounting structure 224 to control relative positions of these two assembly components.

In certain embodiments (as, for example, shown in FIGS. 2B and 2D), a retainer may contact an adhesive material or, more particularly, form an adhesive bond with the adhesive material. Bonding a retainer to an adhesive material may help to create a stronger overall support structure (i.e., a retainer-adhesive composite structure). In other embodiments, retainers and adhesive material patches may be separated from each other, for example, to allow later removal of the retainers or allowing retainers to degrade without interfering with structural support formed by the adhesive patches.

In certain embodiments, a retainer is configured to degrade after installation of the module. This may be desirable, for example, to improve esthetic or functional features of the photovoltaic assembly (e.g., to prevent light interference by the retainer head). In certain embodiments, a retainer is made from one or more of the following biodegradable polymers: a starch-based polymer, a cellulose-based polymer, an amylase-based polymer, a polylactic acid, a polyhydroxybutyrate, a polybutylenesuccinate, a polycaprolactone, and a polyglycolide. In the same or other examples, a retainer includes one or more UV-degradable plastics. In yet another embodiment, retainers are made from water-soluble materials. Finally, a retainer may be made from other non-degradable materials such as poly(ethylene terephthalate), polycarbonate, polypropylene, polyethylene, polypropylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, nylons, poly(urethanes), acrylics, cellulose acetates, cellulose triacetates, cellophane, vinyl chloride polymers, polyvinylidene chloride, vinylidene chloride copolymers, fluoropolymers, polyvinyl fluoride, polyvinylidene fluoride, polytetrafluoroethylene, ethylene-tetrafluoroethylene copolymer, and the like.

Frameless Photovoltaic Module Examples

The following brief description of frameless photovoltaic modules provides some context for various assemblies and components (e.g., retainers) and assembly processes described in this document. While the below description provides examples of frameless module characteristic, photovoltaic assemblies described herein are not limited to these specific examples. One of skill in the art will understand from the description provided herein how to incorporate other frameless modules into the assemblies described herein.

A frameless photovoltaic module may include one or more interconnected photovoltaic cells positioned between a front light-incident sealing sheet and a back sealing sheet. Examples of photocells include microcrystalline silicon, amorphous silicon, cadmium telluride (CdTe), copper indium gallium selenide (CIGS), copper indium selenide (CIS), gallium indium phosphide (GOO), gallium arsenide (GaAs), dye-sensitized solar cells, and organic polymer solar cells. The sealing sheets are used for environmental protection and/or mechanical support of cells. An encapsulant layer is provided at least between the front sheet and the cells for mechanically interconnecting these two elements and substantially filling any voids there-between. Sealing sheets can be made from rigid and/or flexible materials. For example, in certain embodiments both front and back sheets are made from rigid glass sheets. In another example, a front sheet is made from a rigid glass sheet, while a back sheet is made from a flexible sheet. In yet another example, both sealing sheets are flexible. Examples of frameless modules including flexible sheets are provided in U.S. Patent Publication No.

20100071757, incorporated by reference herein for all purposes. Examples of rigid materials include window glass, plate glass, silicate glass, low iron glass, tempered glass, tempered CeO-free glass, float glass, colored glass, and the like. In certain embodiments, one or both of the front and back sheets are made from or include polymer materials. Examples of polymer materials, which can be rigid or flexible, include poly(ethylene terephthalate), polycarbonate, polypropylene, polyethylene, polypropylene, cyclic polyolefins, norbornene polymers, polystyrene, syndiotactic polystyrene, styrene-acrylate copolymers, acrylonitrile-styrene copolymers, poly (ethylene naphthalate), polyethersulfone, polysulfone, nylons, poly(urethanes), acrylics, cellulose acetates, cellulose triacetates, cellophane, vinyl chloride polymers, polyvinylidene chloride, vinylidene chloride copolymers, fluoropolymers, polyvinyl fluoride, polyvinylidene fluoride, polytetrafluoroethylene, ethylene-tetrafluoroethylene copolymer, and the like. A thickness of the sealing sheet may be between about 1 millimeter and about 15 millimeters or, more particularly, between about 2.5 millimeters and about 10 millimeters, for example, about 3 millimeters or about 4 millimeters. In certain embodiments, sealing sheets have various surface treatments and features, such as UV filters, anti-reflective layers, surface roughness, protective layers, moisture barriers, or the like. In a particular example, a back sheet may have its external surface partially treated to improve adhesion to an adhesive material placed between the module and mounting structure. In a particular embodiment, the frontside sheet is a glass sheet. In a more specific embodiment, an external surface of this glass frontside sheet does not contact any metallic components of the mounting structure.

Photovoltaic Module Installation Examples

Figure 3:
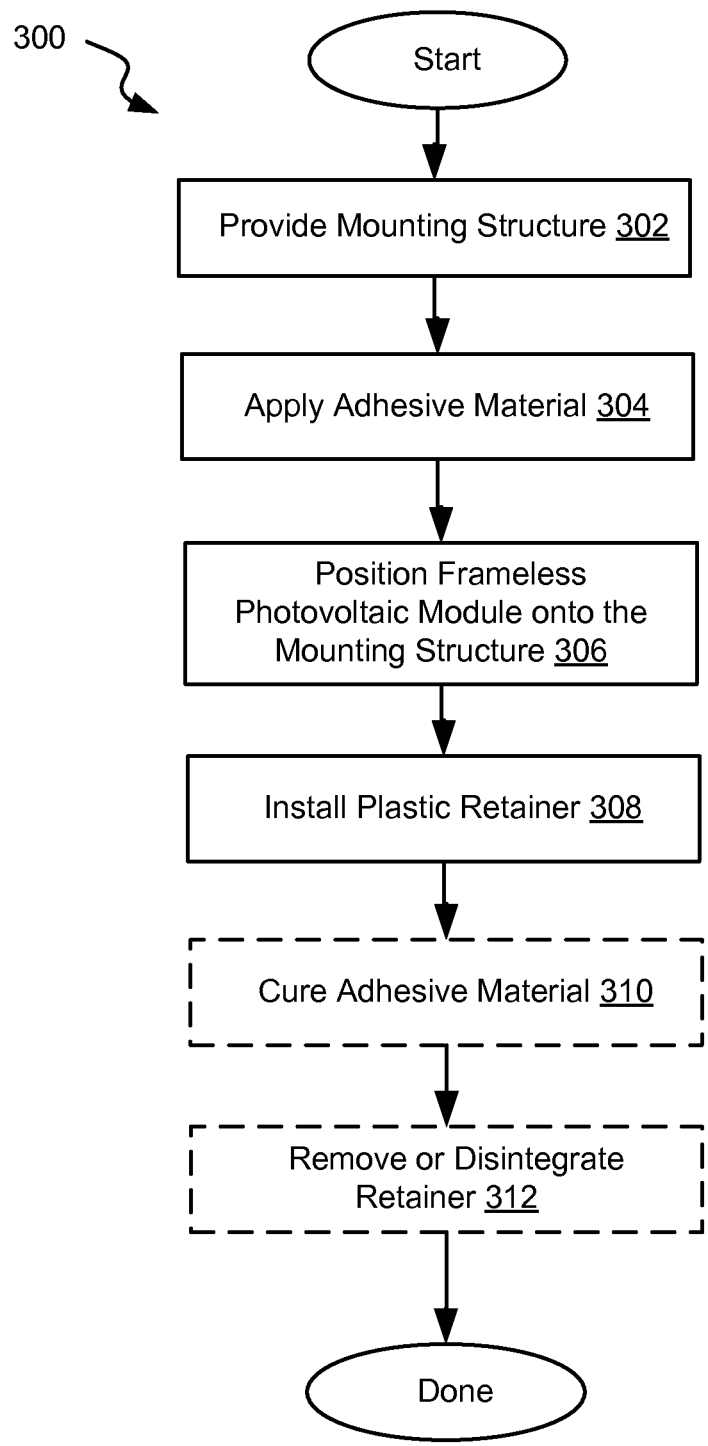
FIG. 3 is a flowchart corresponding to a process of installing a frameless photovoltaic module in accordance with certain embodiments.

FIG. 3 is a flowchart corresponding to a process of installing a frameless photovoltaic module onto a mounting structure in accordance with certain embodiments. Process 300 may start with providing a mounting structure (block 302). Various examples of mounting structures are described above. In a particular example, a mounting structure has at least two rails. Rails may have supporting surfaces for accommodating adhesive materials and slots for receiving at least portions of the retainers. Process 300 may proceed with applying an adhesive material (block 304), various examples of which are also described above. The adhesive material may be applied onto a mounting structure and/or frameless photovoltaic module to be installed on this structure. The adhesive material may be applied in patches at various locations. Sizes and locations of these patches may be determined by various support requirements (e.g., weight of the frameless photovoltaic module, a mounting angle, materials of the bonded surfaces, etc.). In certain embodiments, adhesive patches overlap with retainer locations such that retainers establish contact the adhesive material during installation.

A frameless photovoltaic module may be then positioned over the mounting structure such that the adhesive material contacts both the mounting structure and backside of the module (block 306) followed by installation of one or more retainers (block 308). In certain embodiments, the one or more retainers may be first positioned on the frameless photovoltaic module and then interlocked with the mounting structure during operation 306. In other words, some portions of operations 306 and 308 may be performed simultaneously.

Process 300 may also involve an optional operation 310 that involves curing of the adhesive material. This operation is identified as optional because it may or may not require any particular action from installers. For examples, operations 306 and 308 may be the last two operations performed by the installers. The adhesive material may cure on its own. In other embodiments, curing may require certain actions from installers, such as heating adhesive areas. Process 300 may also involve an optional retainer removal or degradation operation 312. For example, after the adhesive material has been sufficiently cured, installers may remove the retainers and, in certain embodiments, reuse these retainers during another installation project. Alternatively, retainers may be made from various degradable materials described above and degrade over time on their own.

In certain embodiments, retainers may be elongated channels that clip along edges of photovoltaic modules and mounting structures. In particular embodiments, such channels may extend at least about 50% of the module length or even at least about 80% of the module length to provide adequate support.

Conclusion

Although the foregoing invention has been described in some detail for purposes of clarity of understanding, it will be apparent that certain changes and modifications may be practiced within the scope of the appended claims. For example, while the photovoltaic assemblies have been described in the context of frameless modules, in certain embodiments, the retainers described herein may be used with framed modules. It should be noted that there are many alternative ways of implementing the processes, systems and apparatus of the present invention. Accordingly, the present embodiments are to be considered as illustrative and not restrictive, and the invention is not to be limited to the details given herein.

What is claimed is:

1. A photovoltaic assembly comprising:
a frameless photovoltaic module comprising a frontside sheet and a backside sheet;
a mounting structure comprising two rails;
an adhesive material distributed between the backside sheet and each of the two rails and configured for mechanically attaching the backside sheet and the two rails after the adhesive material is cured; and
a retainer attached to the mounting structure and configured to support the frameless photovoltaic module on the mounting structure during curing of the adhesive material.

2. The photovoltaic assembly of claim 1, wherein the retainer is interlocked with one of the rails of the mounting structure.

3. The photovoltaic assembly of claim 1, wherein the retainer exerts a force on the frontside sheet of the frameless photovoltaic module.

4. The photovoltaic assembly of claim 1, wherein the retainer comprises one or more biodegradable polymers selected from the group consisting of a starch-based polymer, a cellulose-based polymer, an amylase-based polymer, a polylactic acid, a polyhydroxybutyrate, a polybutylenesuccinate, a polycaprolactone, and a polyglycolide.

5. The photovoltaic assembly of claim 1, wherein the retainer comprises one or more UV-degradable plastics.

6. The photovoltaic assembly of claim 1, wherein the retainer comprises one or more water soluble plastics.

7. The photovoltaic assembly of claim 1, wherein the retainer comprises a flexible edge configured to bend during the installation of the retainer and to exert a force onto the mounting structure after the installation.

8. The photovoltaic assembly of claim 1, wherein the retainer forms a channel configured to snugly fit around the edge of the frameless photovoltaic module.

9. The photovoltaic assembly of claim 1, wherein the retainer is in contact with the adhesive material.

10. The photovoltaic assembly of claim 1, wherein the frontside and/or backside sheet is a glass sheet.

11. The photovoltaic assembly of claim 10, wherein an external surface of the frontside sheet does not contact any metallic components of the mounting structure.

12. The photovoltaic assembly of claim 1, wherein the frontside sheet and/or the backside sheet are flexible.

13. The photovoltaic assembly of claim 1, wherein the backside sheet comprises one or more materials selected from the group consisting of a polyethylene terephthalate, a polypropylene, a polybutylene, and a polybutylene terephthalate.

14. The photovoltaic assembly of claim 1, wherein the frameless photovoltaic module comprises a feature configured for engaging with the retainer.

15. The photovoltaic assembly of claim 1, wherein the adhesive material is selected from the group consisting of a silicone-based polymer, polyurethane, and epoxy.

16. The photovoltaic assembly of claim 1, wherein the adhesive material is a fast-setting two-component adhesive.

17. The photovoltaic assembly of claim 1, wherein the adhesive material is a UV-stable adhesive.

18. The photovoltaic assembly of claim 1, wherein the backside sheet is pre-treated to improve its bonding to the adhesive material.

19. The photovoltaic assembly of claim 1, further comprising a second frameless photovoltaic module positioned on the mounting structure with the adhesive material distributed between the mounting structure and the second frameless photovoltaic module, wherein the retainer supports the frameless photovoltaic module and the second frameless photovoltaic module on the mounting structure during curing of the adhesive material.

20. The photovoltaic assembly of claim 1, wherein the frameless photovoltaic module is at an angle greater than about 15° relative to horizontal.

21. The photovoltaic assembly of claim 1, wherein the two rails comprise aluminum and/or steel.

22. The photovoltaic assembly of claim 1, wherein the two rails comprise a U-shaped channel.

23. The photovoltaic assembly of claim 1, wherein the frameless photovoltaic module comprises a plurality of interconnected copper indium gallium selenide (CIGS) cells.

24. The photovoltaic assembly of claim 1, wherein the retainer comprises a spacer extending between the backside sheet and the mounting structure and controlling a thickness of the adhesive materials distributed between the backside sheet and each of the two rails.

25. A method of installing a frameless photovoltaic module comprising a frontside sheet and a backside sheet onto a mounting structure, the method comprising:
   providing the mounting structure comprising two rails;
   applying an adhesive material onto the two rails;
   positioning the frameless photovoltaic module onto the mounting structure such that the backside sheet of the frameless photovoltaic module comes into contact with the adhesive material positioned on each of the two rails; and
   installing a retainer onto the mounting structure such that the retainer supports the frameless photovoltaic module on the mounting structure during curing of the adhesive material.

26. The method of claim 25, further comprising curing the adhesive material, wherein the adhesive material is cured within 24 hours.

27. The method of claim 25, further comprising curing the adhesive material, wherein the adhesive material is cured within 8 hours.

28. The method of claim 25, further comprising curing the adhesive material, wherein the adhesive material is cured only after at least 24 hours.

29. The method of claim 25, further comprising removing the retainer after the adhesive material cures.

30. The method of claim 25, wherein the retainer is installed on the mounting structure prior to positing the frameless photovoltaic module onto the mounting structure.

* * * * *